B. B. BLEWETT.
Picket-Stakes.
No. 219,203.          Patented Sept. 2, 1879.
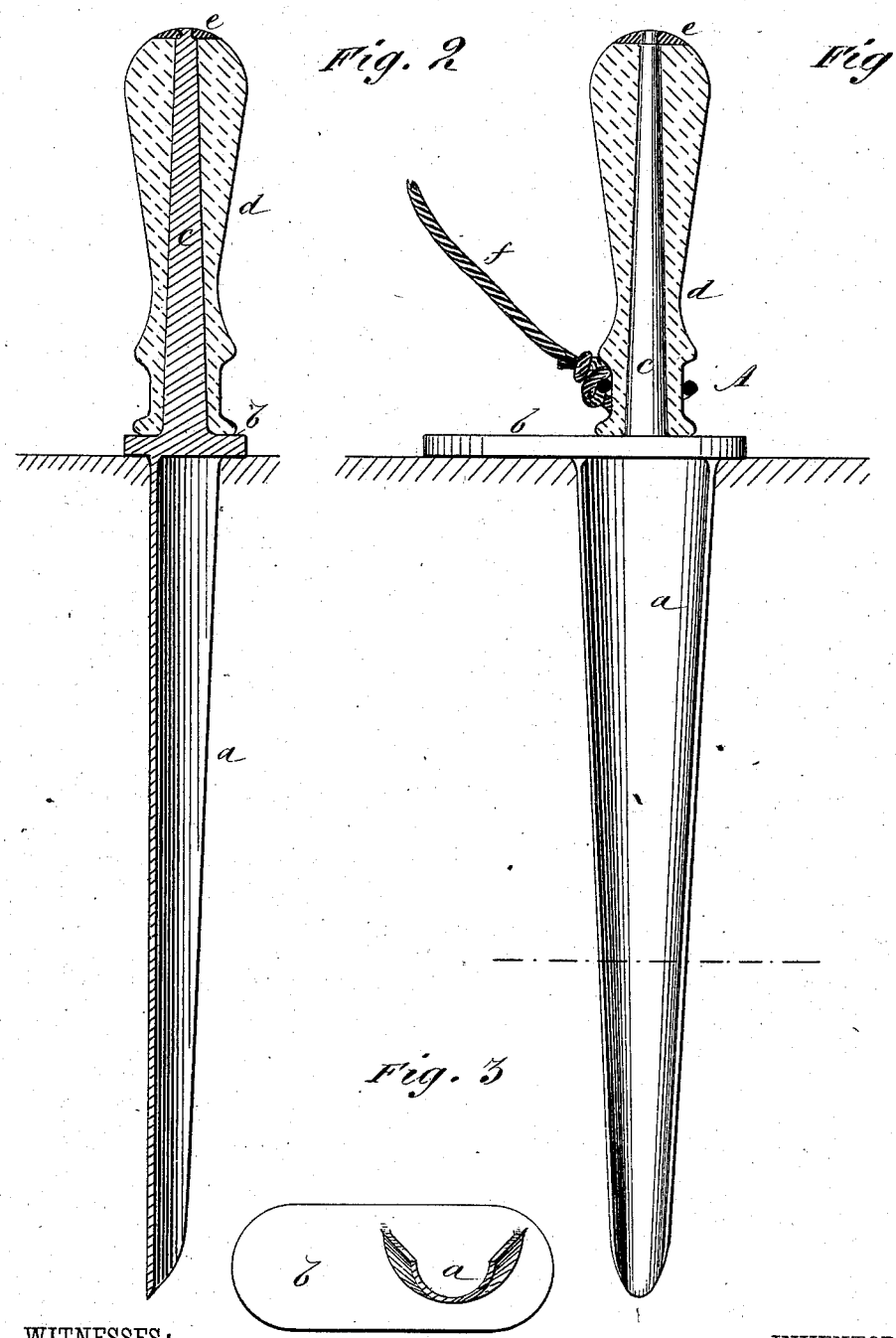

UNITED STATES PATENT OFFICE.

BENJAMIN B. BLEWETT, OF NEW YORK, N. Y.

IMPROVEMENT IN PICKET-STAKES.

Specification forming part of Letters Patent No. 219,203, dated September 2, 1879; application filed July 3, 1879.

*To all whom it may concern:*

Be it known that I, BENJAMIN B. BLEWETT, of the city, county, and State of New York, have invented a new and Improved Picket-Stake, of which the following is a specification.

The object of my invention is to furnish a picket-stake for use in picketing or tethering horses and cattle, which can be readily entered into the ground or removed therefrom without requiring the use of a mallet or other implement to drive it.

The invention consists in a picket-stake having the pin that enters the ground made as a blade, semicircular in cross-section, and tapering lengthwise, and fitted at the base with a plate for driving the blade by pressure of the operator's foot, and the handle for holding the stake while it is being driven. The rope is attached to the handle and the handle fitted to revolve to prevent winding.

By this construction the stake is adapted for use on hard ground, where a round stake would require the use of a heavy mallet to drive it, and is especially adapted for stock-raisers, herders, and others to whom the necessity of carrying a mallet is an inconvenience.

The improved stake is shown in the accompanying drawings, wherein—

Figure 1 is a front view with the handle in section. Fig. 2 is a section lengthwise at right angles to Fig. 1. Fig. 3 is an inverted end view with the blade in transverse section.

Similar letters of reference indicate corresponding parts.

The pin or blade $a$, foot-plate $b$, and shank $c$ of the handle are made in one piece of steel or malleable iron. Upon the shank $c$ is fitted a wooden handle, $d$, which turns freely on the shank, and is prevented from coming off by a washer, $e$, that is secured on the outer end of the shank.

The blade $a$, as shown, is of thin metal, semicircular, or nearly so, in cross-section, and tapering from the base or hilt to a point at the outer end. By having the blade of this shape it is light, of great strength, and is readily forced into the ground, and holds securely.

The foot-plate $b$ extends principally at one side to give opportunity for placing the foot upon it, and when the stake is fully entered the foot-plate rests upon the ground and assists in preventing the stake from being loosened by a strain on the rope.

The rope, as shown at $f$, is to be attached directly around the handle $d$, the handle being grooved near the bottom for that purpose; or the handle may have a collar with a swivel-ring for connection of a snap-hook. In either case the rope cannot become wound, and being attached close to the ground the shank will not break by any pull or strain that it is likely to be subjected to.

To enter the stake the operator holds the same upright by the handle with the point on the ground, and then, by placing one foot on the plate $b$, forces the blade into the ground, and the whole weight of the body may be used after the stake is entered a short distance.

Having thus described my invention, I claim as new and desire to secure by Letters Patent—

1. The improved picket-stake, consisting of the blade $a$, foot-piece $b$, and handle $d$, combined together, substantially as described and shown.

2. In picket-stakes, the foot-piece $b$, connected at the base of the blade or pin, and provided with the revolving handle, substantially as and for the purposes set forth.

BENJAMIN B. BLEWETT.

Witnesses:
GEO. D. WALKER,
C. SEDGWICK.